United States Patent [19]

Ohmura et al.

[11] 4,321,179

[45] Mar. 23, 1982

[54] PROCESS FOR PRODUCING AN AQUEOUS LIQUID DISPERSION OF POLYMERS

[75] Inventors: Hiroshi Ohmura, Aichi; Masaharu Nakayama, Nagoya, both of Japan

[73] Assignee: Nippon Oil and Fats Co., Ltd., Tokyo, Japan

[21] Appl. No.: 208,465

[22] Filed: Nov. 19, 1980

[30] Foreign Application Priority Data

Nov. 28, 1979 [JP] Japan .................................. 54/153873
Nov. 30, 1979 [JP] Japan .................................. 54/155035
Mar. 22, 1980 [JP] Japan .................................. 55/36515

[51] Int. Cl.$^3$ ............................................. C08L 53/00
[52] U.S. Cl. .................................... 524/599; 526/232.3
[58] Field of Search .............. 260/29.6 RW, 29.6 PM; 526/232.3

[56] References Cited

U.S. PATENT DOCUMENTS 3,536,676 10/1970 Mojeli et al. ..................... 260/78.5
4,238,381 12/1980 Komai et al. .................. 260/31.2 R Primary Examiner—Joseph L. Schofer
Assistant Examiner—Bernard Lipman
Attorney, Agent, or Firm—Blanchard, Flynn, Thiel, Boutell & Tanis

[57] ABSTRACT

One or more polymeric peroxides and vinyl type monomers containing vinyl type unsaturated carboxylic acid monomers are subjected to copolymerization, followed by neutralizing more than 50 mole percent of the carboxylic acid groups in the resultant product, thereby obtaining copolymers having peroxy bonds therein which are soluble in water or a mixed solution of water and anaqueous organic solvent (represented as solvent D in this disclosure). The said copolymers having peroxy bonds therein and vinyl type monomers are subjected to block-copolymerization, in the presence of solvent D, whereby the said copolymers having peroxy bonds in the molecule thereof are cleavaged at the peroxy bonds thereof, obtaining block copolymers with high efficiency.

Combining order of the vinyl type monomers employed in the first copolymerization and the ones employed in the second copolymerization may be reversely employed. The neutralization of the carboxylic acid groups may be carried out after the second block copolymerization.

The said block copolymer consists of polymer parts which are soluble in solvent D and other polymer parts which are insoluble in solvent D. When it is mixed with solvent D, the polymer parts which are soluble in solvent D are elongated and the other polymer parts which are insoluble in solvent D are coagulated to become particles in solvent D, with the result that the resultant mixture of the block copolymer and the solvent, becomes to be in the state of dispersion in the solvent.

9 Claims, No Drawings

PROCESS FOR PRODUCING AN AQUEOUS LIQUID DISPERSION OF POLYMERS

BACKGROUND OF THE INVENTION

1. Field of the Invention

This invention relates to a process for producing an aqueous liquid dispersion of polymers.

2. Description of the Prior Art

An aqueous liquid dispersion of polymers is broadly useful as a water-based paint, printing ink, fiber processing aid, paper processing aid, leather processing aid, bonding agent and tackifier. The water-based paint is promising for future, use because there is no fear of pollution and exhaustion of supplies of water.

One of the known methods for producing an aqueous liquid dispersion of polymers comprises subjecting vinyl-type monomers whose polymers are insoluble in water or a mixed solution of water and an aqueous organic solvent, to graft polymerization in the presence of a dispersion stabilizer which is soluble in water or a mixed solution of water and an aqueous organic solvent.

For example, as a dispersion stabilizer, there are mentioned maleinized polybutadiene in Japanese Patent Publication No. SHO 49-43381, water soluble unsaturated polyester in Japanese Patent Publication No. SHO 53-9795 and water soluble polymer in the molecule of which polymerizable vinyl groups are introduced in Japanese Laid-Open Publication No. SHO 53-17680.

These methods have faults in that the processes not only are complicated, but also, because the polymerization yield thereof in the block polymerization process is low, the reaction time thereof is long, the productivity is low and the dispersion stability and the storage stability of the liquid dispersion are bad. When maleinized polybutadiene or unsaturated polyester is employed as a dispersion stabilizer in producing a liquid dispersion, the resultant liquid dispersion has faults in that when it is used for e.g. painting, a uniform painting film cannot be obtained with ease and the exterior durability thereof is bad.

SUMMARY OF THE INVENTION

An object of the present invention is to provide a method for producing an aqueous liquid dispersion of polymers which employs simple procedural steps and in which the block copolymerization efficiency is high.

Another object of the present invention is to provide a method for producing an aqueous liquid dispersion of polymers which possesses splendid dispersion stability, has a high concentration of solid matter and has a low viscosity.

A still further object of the present invention is to provide a method for producing an aqueous liquid dispersion of polymers which is useful for a coating composition whose cured film is splendid in smoothness and lustre and is capable of being continuously formed.

The present invention is based on the discovery that one or more polymeric peroxides and vinyl type monomers comprising vinyl type unsaturated carboxylic acid monomers are subjected to copolymerization, whereby copolymers having peroxy bonds and carboxylic acid groups in the chains thereof are obtained, folowed by neutralizing more than 50 mol percent of the carboxyl groups of the said copolymers with an organic amine or inorganic alkali, thereby obtaining copolymers having peroxy bonds in the molecule thereof which are soluble in water or a mixture of water and an aqueous organic solvent and that the said copolymers having peroxy bonds in the molecule thereof are subjected to copolymerization, in the presence of water or a mixture of water and an aqueous organic solvent, with vinyl type monomers, whereby the said copolymers having peroxy bonds in the molecule thereof are cleaved at the peroxy bonds thereof, thereby obtaining block copolymers with high efficiency.

The present invention is based on the second discovery that the said block copolymer consists of polymer parts which are soluble in the said solvent and polymer parts which are insoluble in the said solvent and that when the said block copolymer is mixed with the said solvent, the polymer parts which are soluble in the said solvent are elongated and the polymer parts which are insoluble in the said solvent are coagulated to become particles in the said solvent, with the result being that the resultant mixture of the block copolymer and the solvent becomes a dispersion of the copolymer in the said solvent.

The present invention is based on the third discovery that the aforementioned block copolymers may also be obtained according to the same procedures as described in the first discovery, except that the vinyl type monomers are employed in the first copolymerization and the vinyl type monomers containing the unsaturated carboxylic acid group are employed in the second copolymerization and the neutralization is carried out following the second copolymerization.

The present invention is also based on the fourth discovery that the resultant product containing the block copolymer and water or a mixture of water and an aqueous organic solvent, which is obtained in the block copolymerization, may be used alone as an aqueous liquid dispersion of polymers and that when the solvent is an aqueous organic solvent, the said resultant product containing the block copolymer and the aqueous organic solvent is admixed with water or a mixture of water and an aqueous organic solvent, or it is admixed with water after removing the aqueous organic solvent therefrom, thereby obtaining an aqueous liquid dispersion of polymers.

The aqueous liquid dispersion of polymers, according to the present invention is prepared by the following method.

The method for producing an aqueous liquid dispersion of polymers comprises a first step of copolymerizing one or more polymeric peroxides selected from the group consisting of the compounds having the following general formulas (1) and (11), with vinyl type monomers selected from a group consisting of vinyl type monomers which are defined in the following definition (a), (b) and (c) (designated as vinyl monomers A,B and C respectively), thereby obtaining copolymers having peroxy bonds therein. In the second step, said copolymers having peroxy bonds therein are subjected to block copolymerization with vinyl type monomers which are one of vinyl monomers, A, B and C but which are different from the vinyl type monomers employed in the first step, for example employing monomers B in the first step and monomers C in the second step or employing monomers C in the first step and monomers B in the second step. The second step is performed in the presence of a solvent which is water or a mixed solution of water and an aqueous organic solvent (defined in the definition (d) and designated as solvent D hereinafter). The vinyl type monomers A are employed in either of the said two steps and more than 50 mol % of the carboxylic acid groups in the resultant product, which is obtained in the copolymerization employing vinyl monomer A, is neutralized with an organic amine or an inorganic alkali,

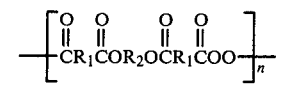 (I)

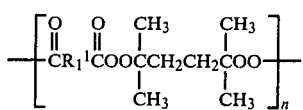 (II)

wherein $R_1$ is an alkylene group having 1 to 18 carbon atoms or a phenylene group, and $R_2$ is (1) alkylene group having 2 to 10 carbons, (2) a group of the formula

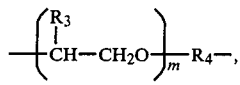

wherein $R_3$ is hydrogen or methyl, $R_4$ is an alkylene group having 2 to 10 carbon atoms and m is an integer of 1 to 13, (3)

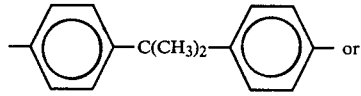 or (4) 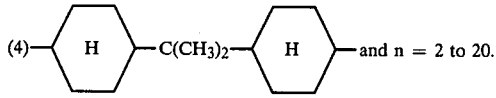 and n = 2 to 20.

Definition (a); vinyl monomer A is a mixture of 5–40 parts by weight of unsaturated vinyl type carboxylic acid monomers and 95–60 parts by weight of vinyl type monomers which are different from said unsaturated vinyl type carboxylic monomers Definition (b); vinyl monomer B is one or more vinyl type monomers which are different from vinyl monomer A and whose polymers are insoluble in solvent D.

Definition (c); vinyl monomer C is a mixture of vinyl monomer B and one or more vinyl type monomers which are different from vinyl monomer B, and whose polymers are soluble in solvent D. The block copolymer parts derived from the polymer of the said vinyl monomer C in the desired product are not dissolved in solvent D.

Definition (d); solvent D is water or a mixed solution of water and an aqueous organic solvent which may dissolve a copolymer which is obtained by neutralizing more than 50 mol % of carboxylic acid of a copolymer of vinyl monomer A with an organic amine or an inorganic alkali and does not dissolve vinyl monomer B or C.

Illustrative typical polymeric peroxides of the general formula (1) are the following:

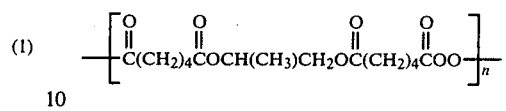

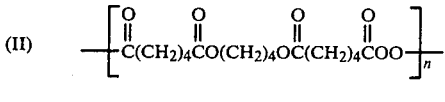

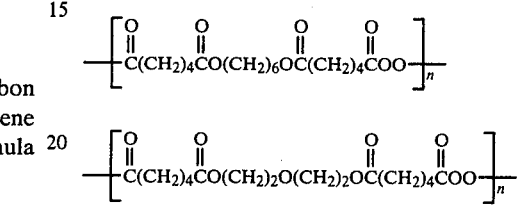

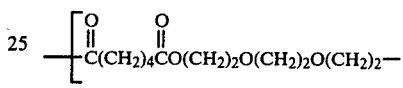

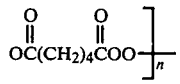

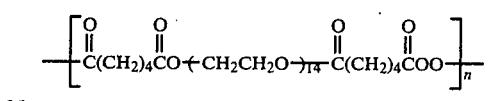

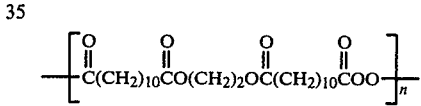

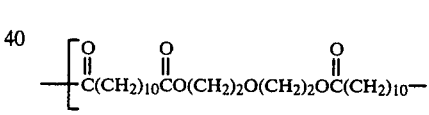

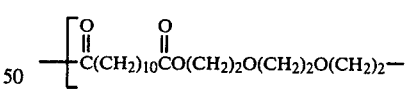

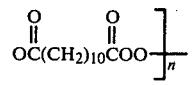

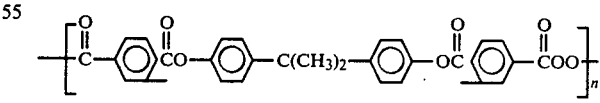

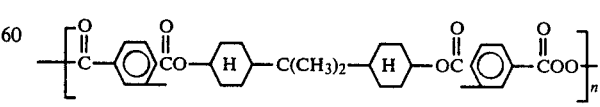

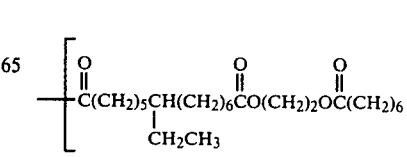

$$\left[-CH(CH_2)_5\overset{O}{\underset{|}{\underset{CH_2CH_3}{C}}}OO-\right]_n$$

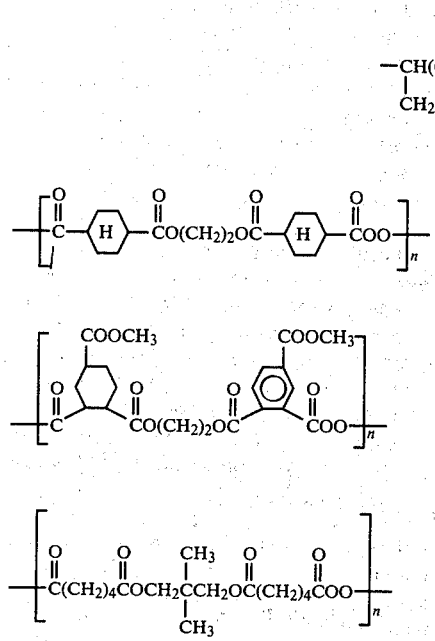

Illustrative typical polymeric peroxides of the general formula (11) are the followings.

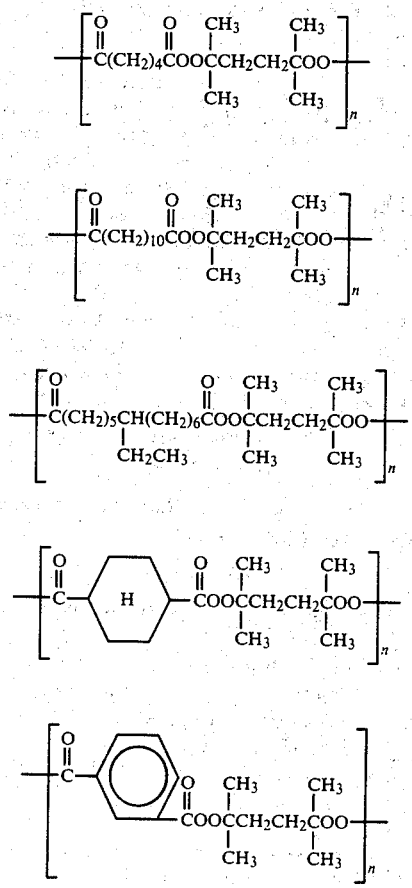

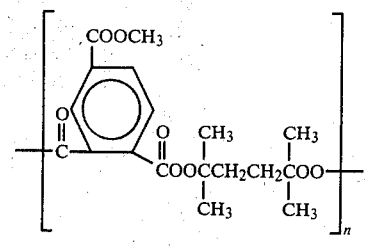

$n = 2 - 20$

As the aqueous organic solvent employed in the present invention, there are mentioned solvents which are soluble with water in any proportion at room temperature such as methyl alcohol, n-propyl alcohol, iso-propyl alcohol, tert-butyl alcohol, methyl cellosolve, ethyl cellosolve, butyl cellosolve, methoxybutyl alcohol, methylcarbitol, ethylcarbitol, acetone, dioxane, methyl cellosolve acetate, carbitol acetate, and the like, and solvents whose solubility in water is 7–25 percent by weight, such as n-butyl alcohol, iso-butyl alcohol, sec-butyl alcohol, methyl ethyl ketone, methyl acetate, ethyl acetate, cellosolve acetate and the like.

Upon use of these solvents, they must be selected according to the water soluble polymer part of the block copolymer of the present invention and the solubility of the water insoluble polymer part of the same.

As the unsaturated vinyl type carboxylic acid monomers of the present invention, there are mentioned for example, (meth)acrylic acid ((meth)acrylic acid includes acrylic acid and methacrylic acid, and this rule applies hereinafter), itaconic acid, maleic acid, fumaric acid, crotonic acid and the like.

As vinyl monomers which are different from said unsaturated vinyl type carboxylic acid monomers and are employed in vinyl monomers A, there are mentioned for example, butadiene, styrene, vinyl acetate, vinyl propionate, vinyl chloride, vinylidene chloride, (meth)acrylonitrile, methyl (meth)acrylate, ethyl(meth)acrylate, n-propyl(meth)acrylate, isopropyl(meth)acrylate, butyl(meth)acrylate, isobutyl (meth)acrylate, tert-butyl (meth)acrylate, n-hexyl (meth)acrylate, cyclohexyl (meth)acrylate, octyl (meth)acrylate, benzyl (meth)acrylate, 2-ethylhexyl (meth)acrylate, lauryl (meth)acrylate, stearyl (meth)acrylate, glycidylester (meth)acrylate, methylglycidylester (meth)acrylate, (meth)allylglycidyl ether, hydroxyethyl (meth)acrylate, hydroxypropyl (meth)acrylate, polyethyleneglycolester (meth)acrylate, (meth)acryl amide, N-methylol (meth)acryl amide, N-butoxymethyl (meth)acryl amide, vinyl toluene, vinyl pyrrolidone dibutyl fumarate and the like.

The vinyl type unsaturated carboxylic acid monomers are used in a mixture thereof with different vinyl type monomers other than the same.

The mixing ratio of the vinyl type unsaturated carboxylic acid monomer is 5–40 wt.% based on the total weight of the mixture and the vinyl type monomers other than the vinyl type unsaturated carboxylic acid monomer are the balance. When the content of the vinyl type unsaturated carboxylic acid monomer is outside of the said range, the block copolymers in the aqueous liquid dispersion of polymers bring about aggregation and adhesion.

A copolymer which is obtained by copolymerizing one or more polymeric peroxides with vinyl monomer A, contains carboxylic acid groups in the molecule.

As the organic amines for neutralizing the said carboxylic acid groups, there are mentioned for example, trimethyl amine, triethyl amine, tributyl amine, diethylamino ethanol, monoethanol amine, triethanol amine, N-methylethanol amine, N-ethylethanol amine, N-methyldiethanol amine and the like.

As the inorganic alkali for neutralizing the said carboxylic acid groups, there are mentioned, for example, ammonia, sodium hydroxide, potassium hydroxide and the like.

As the vinyl monomers which are different from monomer B and which are contained in vinyl monomer C, there are mentioned for example, hydroxyethyl (metha)acrylate, hydroxypropyl (metha)acrylate, mono (metha)acrylic polyethyleneglycolesters, mono (metha)acrylic polypropylene glycolesters, (metha)acryl amide, N-methylol amide and N-butoxymethyl acryl amide.

The amount of the polymeric peroxide employed in the first copolymerization is preferably 0.5-20 parts by weight based on 100 parts of the vinyl type monomers used, the copolymerization temperature is 60°-130° C. and the copolymerization time is 2-5 hours.

When vinyl monomer A is employed in the first copolymerization, the resultant product is neutralized with an organic amine or an inorganic alkali, thus thereby obtaining a copolymer having peroxy bonds in the molecule thereof. In carrying out the neutralization, more than 50 mol % of the carboxylic acid groups in the said resultant product are neutralized. When less than 50 mol % of the carboxylic acid groups are neutralized, the obtained copolymer having peroxy bonds therein are not made soluble sufficiently.

The polymerization of the block—copolymerization is 60°-140° C. and the polymerization times is 3-6 hours preferably.

When the block—copolymerization is carried out in a mixture of water and an aqueous organic solvent, the mixing ratio of the aqueous organic solvent to water is preferably less than 80 wt.%. The amount of solvent D used in the block—copolymerization is preferably in the range wherein the concentration of the solid matter in the desired aqueous liquid dispersion of polymers is preferably 30-70 wt.%. In other words the solvent D content in the aqueous dispersion of polymers is preferably 70-30 wt.%.

The ratio of the polymer parts which are soluble in solvent D to the polymer parts which are insoluble in solvent D in the resultant block copolymer, is not defined particularly. However, in view of the stability of the aqueous liquid dispersion of polymers of the present invention, the amount of the polymer part which is soluble in solvent D is preferably 5-70 wt.% based on the sum of the amount of the polymer part which is soluble in solvent D and that of the polymer which is insoluble in solvent D.

The aqueous liquid dispersion of polymers of the present invention is very useful for a coating composition. If necessary, it can be mixed with other resins, pigments, fillers, or many kinds of conventional additives for the coating procedure. As the other resin, there are mentioned, melamine resin, epoxy resin, phenol resin, vinyl resin and the like.

Compared with conventional methods for producing an aqueous liquid dispersion of polymers, the present invention has advantages described in the following.

(1) According to the conventional methods, an aqueous liquid dispersion of polymers has been produced by three steps comprises synthesizing a polymer which is soluble in a solvent, introducing some functional groups, such as vinyl groups, into the molecule of the said polymer and binding the said functional groups with parts of a polymer which is insoluble in the solvent.

On the contrary, according to the present invention, an aqueous liquid dispersion of polymers can be obtained simply by two steps comprises copolymerizing polymeric peroxides and vinyl monomers, thus obtaining a copolymer having peroxy bonds in the molecule thereof and subjecting the obtained copolymer to block—copolymerization with vinyl type monomers, thereby cleaving the peroxy bonds thereof to produce the soluble or the insoluble part of the block copolymer directly.

(2) According to the present invention, an aqueous dispersion liquid of polymers which contains a high concentration of solid matters therein and which is very stable and whose viscosity is low, can be obtained, whereas it mainly consists of solvent D and a block copolymer comprising the polymer part thereof which is soluble in solvent D and the polymer part thereof which is insoluble in solvent D.

(3) According to the present invention, the amount of the polymer part which is soluble in solvent D is obtained by neutralizing carboxylic acid groups which were introduced in polymer parts derived from vinyl type monomers containing vinyl type unsaturated carboxylic acid monomers.

Accordingly, an aqueous liquid dispersion of polymers of the present invention can be suitably used for making a water-based paint, printing ink, fiber processing aid, paper processing aid, leather processing aid, bonding agent and tackifier and like, respectively, by selection of the number of the carboxylic acid groups therein, the degree of neutralization and the composition of the vinyl type monomers employed in the two steps of copolymerization.

A coating composition which is prepared by employing the aqueous dispersion liquid of polymers, whose cured coating film is splendid in smoothness, can form a continuous coated film which is very lustrous.

PREFERRED EMBODIMENTS OF THE INVENTION

The term "part" and "%" shall mean parts by weight and "%" by weight hereinafter.

EXAMPLE 1

(A-1); Preparation of a polymer having peroxy bonds therein 20 parts of ethyl cellosolve were charged into a reaction vessel which was provided with a thermometer, a stirrer and a reflux and were heated up to 75° C. while introducing nitrogen gas therein.

A mixed solution (1—1) having the following composition as shown in Table 1 in parts

| Ethyl cellosolve | 30 |
|---|---|
| Acrylic acid | 3.75 |
| Styrene | 7.5 |

-continued

| Butyl acrylate | 8.75 |
| 2-Ethylhexyl acrylate | 5.0 |
| | 5.0 |
| $-[C(CH_2)_4CO(CH_2)_4OC(CH_2)_4COO]_{5.5}-$ with structure showing four C=O groups | | was charged into the reaction vessel for one hour.

The content of the reaction vessel was subjected to copolymerization for 1.5 hours. The resultant solution was cooled to room temperature and was neutralized with 3.7 parts of triethyl amine, thereby obtaining a solution of a copolymer having peroxy bonds therein. The obtained solution contained 39.8% of a copolymer having peroxy bonds therein.

Its viscosity was 1.8 poise at 25° C. and it was a transparent liquid.

This obtained product is designated as (A-1) product. This is to be employed in the following.

(B-1); Preparation of an aqueous liquid dispersion of polymers 80 parts of water was charged into a reaction vessel which was provided with a thermometer, a stirrer and a reflux and was heated up to 80° C. while introducing nitrogen gas therein.

A mixed solution (1-2) having the following composition as shown in Table 2 in parts

| (A-1) product | 60 |
| Ethyl acrylate | 25 |
| Butyl acrylate | 10 |
| Methyl methacrylate | 25 |
| Water | 60 | was dropped into the reaction vessel for 2 hours. The contents of the reaction vessel were subjected to block-copolymerization for 3 hours, thus obtaining a milky white liquid dispersion of polymers. The properties of the obtained aqueous liquid dispersion of polymers were as shown in Table 2. The application test for the obtained aqueous liquid dispersion of polymers was carried out by a process which comprises applying the same onto a mild steel plate to obtain a dried coating film of 30-40μ, followed by further heating forcibly at 140° C. for 30 minutes and inspecting the appearance, smoothness, and lustrousness of the obtained coating film, and the presence of foaming and flagging therein, thereby evaluating whether the same is bad or good.

EXAMPLE 2

(A-2); Preparation of a copolymer having peroxy bonds therein

A copolymer having peroxy bonds therein was prepared according to the same procedures as described in Example 1, except that the charging composition as shown in Table 1 was charged and the copolymerization temperature was 90° C.

The properties of the obtained copolymer having peroxy bonds therein are shown in Table 1.

(B-2); Preparation of an aqueous liquid dispersion of polymers

An aqueous liquid dispersion of polymers was prepared according to the same procedures as described in the (B-1) procedure of Example 1 except that the charging composition described in (B-2) of Table 2 was used, and that the polymerization temperature of the block copolymerization reaction was 95° C., employing the (A-2) product, whereby a white milky aqueous liquid dispersion of polymers whose dispersion solvent is water, ethyl cellosolve, butyl cellosolve, and isopropyl alcohol was obtained.

The properties of the obtained aqueous liquid dispersion of polymers are shown in Table 2.

The application test therefor was carried out according to the same procedures as described in (B-1) of Example 1. The obtained coating film was evaluated to be good.

EXAMPLE 3

(A-3); A copolymer having peroxy bonds therein

The copolymers having peroxy bonds therein which was obtained in (A-1) procedure, was employed.

(B-3); Preparation of an aqueous liquid dispersion of polymers

A white milky aqueous liquid dispersion of polymers whose dispersion solvent was water and ethylcellosolve, was prepared employing ethylcellosolve solution of (A-1) product, the charging composition as shown in (B-3) of Table 2, according to the same procedures as described in (B-1) procedure of Example 1.

The properties of the obtained aqueous liquid dispersion of polymers are shown in Table 2. The application test therefor was carried out according to the same procedures as in the (B-1) procedures of Example 1. The obtained coating film was evaluated to be good.

EXAMPLE 4

(A-4); Preparation of a copolymer having peroxy bonds therein

A transparent solution of ethylcellosolve and a copolymer having peroxy bonds therein was prepared, employing the charging composition as shown in (A-4) of Table 1, according to the same procedures as described in (A-1) of Example 1. The properties of the obtained copolymer having peroxy bonds therein are shown in Table 1.

(B-4); Preparation of an aqueous liquid dispersion of polymers whose dispersion solvent was water, ethylcellosolve and isopropyl alcohol, was prepared employing (A-4) product and the charging composition as shown in Table 2, according to the same procedures as shown in (b-1) of Example 1.

The properties of the obtained aqueous liquid dispersion of polymers are shown in Table 2. The application test therefor was carried out according to the same procedures as in (B-1) of Example 1. The obtained coating film was evaluated to be good.

EXAMPLE 5

(A-5); Preparation of a copolymer having peroxy bonds therein 60 parts of (A-2) product were admixed with 500 parts of n-hexane while stirring. The resultant mixture was allowed to stand, thereby obtaining a white precipitate.

It was filtered off and was dried at room temperature at reduced pressure, to remove butyl cellosolve and isopropyl alcohol, whereby a white powder of a copolymer having peroxy bonds therein was obtained.

(B-5); Preparation of an aqueous liquid dispersion of polymers

An aqueous liquid dispersion of polymers whose dispersion solvent was water alone, was prepared according to the same procedures as in (B-1) procedure of Example 1, except that the polymerization temperature of the block copolymerization reaction was 95° C., employing the white powder obtained by the (A-5) procedure and the charging composition as shown in Table 1.

The properties of the obtained aqueous liquid dispersion of polymers are shown in Table 2.

The application test therefor was carried out according to (B-1) procedure of Example 1.

EXAMPLE 6

(A-6); Preparation of a copolymer having peroxy bonds therein

A transparent solution of ethylcellosolve and a copolymer having peroxy bonds therein was prepared according to the same procedures as in the (A-1) procedure of Example 1, employing itaconic acid as the vinyl type unsaturated carboxylic acid group and the charging composition as shown in Table 1.

The properties of the obtained copolymer having peroxy bonds therein are shown in Table 1.

(B-6); Preparation of an aqueous liquid dispersion of polymers

A milky white aqueous liquid dispersion of polymers was prepared, according to the same procedures as the (B-1) procedure of Example 1, employing the (A-6) product, the same vinyl type monomers as employed in (B-4) procedures of Example 4 and the charging composition as described in Table 2.

The properties of the obtained product are shown in Table 2.

The application test therefor was carried out likewise (B-1) procedures of Example 1.

TABLE 1

| | | | Example 1 A-1 | Example 2 A-2 | Example 3 A-4 | Example 4 A-6 |
|---|---|---|---|---|---|---|
| Charging Composition | Aqueous organic Solvent | Ethylcellosolve | 20[1] + 30[2] | — | 10[1] + 20[2] | 10[1] + 20[2] |
| | | Butyl cellosolve | — | 30 | — | — |
| | | Isopropyl alcohol | — | 20 | — | — |
| | Vinyl monomer | Vinyl type unsaturated carboxylic acid monomer | Acrylic acid | 3.75 | 1.25 | 2.5 | — |
| | | Itaconic acid | — | — | — | 2.0 |
| | A | Vinyl type monomer other than vinyl type unsaturated carboxylic acid monomer | Styrene | 7.5 | 7 | 5.5 | 6 |
| | | Butyl acrylate | 8.75 | 8.75 | 8 | 8 |
| | | 2-Ethylhexyl acrylate | 5 | 5 | 6 | 6 |
| | | Hydroxyethyl acrylate | — | 3 | 3 | 3 |
| | Polymeric peroxide | $\left[-C(CH_2)_4CO(CH_2)_4OC(CH_2)_4COO-\right]_{5.5}$ (with four C=O groups) | 5 | — | — | 2.5 |
| | | $\left[-C(CH_2)_4CO(CH_2)_2O(CH_2)_2O(CH_2)_2OC(CH_2)_4COO-\right]_{5.8}$ | — | — | 2.5 | — |
| | | $\left[-C(CH_2)_4COOC(CH_3)_2CH_2CH_2C(CH_3)_2COO-\right]_{3.5}$ | — | 1 | — | — |
| | | Aromatic peroxide (phenyl/C(CH_3)_2 bridged structure), subscript 3.6 | — | 3.5 | — | — |
| Neutralization agent | | Triethyl amine | 3.7 | — | — | 3.5 |
| | | Diethanol amine | — | 1.7 | — | — |
| | | Aqueous water of ammonia | — | — | 3.5 | — |
| Properties of the obtained solution of a copolymer having peroxy bonds therein | | Content of the copolymer having peroxy bonds therein (%) | 39.8 | 37.8 | 45.8 | 45.5 |
| | | Viscosity at 25° C. (poise) | 1.8 | 2.1 | 8.8 | 11.3 |

Note:
[1] Number of parts of solvent which was charged into the reaction vessel at first
[2] Number of parts of solvent which was charged with vinyl monomer A and polymeric peroxides

TABLE 2

| | | | Example B-1 | Example B-2 | Example B-3 | Example B-4 | Example B-5 | Example B-6 |
|---|---|---|---|---|---|---|---|---|
| Charging Composition | Solution of Copolymer having peroxy bonds | (A-1) product | 60 | — | 60 | — | — | — |
| | | (A-2) product | — | 60 | — | — | — | — |
| | | (A-4) product | — | — | — | 60 | — | — |

TABLE 2-continued

| | | Example B-1 | B-2 | B-3 | B-4 | B-5 | B-6 |
|---|---|---|---|---|---|---|---|
| | therein | | | | | | |
| | (A-6) product | — | — | — | — | — | 60 |
| Copolymer having peroxy bonds[1] therein | | — | — | — | — | 20 | — |
| Vinyl monomer B | Ethyl acrylate | 25 | 25 | 15 | — | — | — |
| | Butyl acrylate | 10 | 10 | 12.5 | 40 | — | 40 |
| | Methyl methacrylate | 25 | 25 | 25 | — | 30 | — |
| | Butyl methacrylate | — | — | — | — | 40 | — |
| | Styrene | — | — | — | 43 | 30 | 43 |
| Vinyl monomer C | Hydroxyethyl methacrylate | — | — | 7 | 15 | — | 15 |
| | Acrylic acid | — | — | 0.5 | 2 | — | 2 |
| | Water | $80^2 + 60^3$ | $80^2 + 60^3$ | $80^2 + 60^3$ | $30^2 + 30^3$ | $60^2 + 40^3$ | $30^2 + 30^3$ |
| Properties of the obtained aqueous liquid dispersion of polymers | Content of block copolymer (%) | 32.1 | 31.8 | 32.3 | 57.7 | 55.3 | 56.9 |
| | Viscosity at 25° C. (poise) | 0.7 | 0.4 | 0.9 | 13.8 | 6.8 | 15.9 |
| | Storage stability[4] (25° C. after 6 months) | good | good | good | good | good | good |
| | Result of application test[5] | good | good | good | good | good | good |

Note;
[1] The resultant product octained by separating butyl cellosolve and isopropyl alcohol from (A-2) product
[2] Parts of water which were charged into the reaction vessel at first
[3] Parts of water which were charged with vinyl type monomer and copolymer having peroxy bonds therein
[4] Storage stability of the obtained product wherein no appreciable precipitation of the particles therein, no appreciable separation thereof into two layers and no changes of viscosity thereof were observed, was evaluated as good.
[5] In the application test for the obtained product, evaluation of "good" showed that the coating film thereof was smooth and lustrous and no appreciable foaming nor flagging was observed therein (A-7); Preparation of a polymer having peroxy bonds therein 20 parts of ethyl cellosolve were charged into the reaction vessel which was provide with a thermometer, a stirrer and a reflux and were heated up to 75° C. while introducing nitrogen gas therein.

A mixed solution (1–7) having the following composition in parts as shown in Table 3

| | |
|---|---|
| Ethyl cellosolve | 30 |
| Acrylic acid | 3.75 |
| Styrene | 7.5 |
| Butyl acrylate | 8.75 |
| 2-Ethylhexyl acrylate | 5.0 |
| 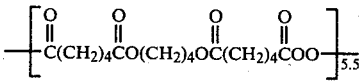 | 5.0 | was charged into the reaction vessel for one hour.

The contents of the reaction vessel were subjected to copolymerization for 1.5 hours.

The resultant product contained 37.6% of a copolymer having peroxy bonds therein. It was a transparent solution whose viscosity was 0.6 poise at 25° C.

(B-7); Preparation of an aqueous liquid dispersion of polymers 20 parts of ethylcellosolve were charged into a reaction vessel which was provided with a thermometer, a stirrer and a reflux and was heated up to 80° C. while introducing nitrogen gas therein.

A mixed solution (1–7) having the following composition

| | |
|---|---|
| (A-7) product | 60 |
| Ethyl acrylate | 25 |
| Butyl acrylate | 10 |
| Methyl methacrylate | 25 | was dropped into the reaction vessel for 2 hours. The contents of the reaction vessel were subjected to block copolymerization at 80° C. for 3 hours. The resultant product was cooled to room temperature and was neutralized with 2,8 parts of triethyl amine, and was admixed with 120 parts of water, whereby a white milky aqueous liquid dispersion of polymers was obtained.

The properties of the obtained product are shown in Table 4, wherein the application test was carried out according to the same procedures as the (B-1) procedures of Example 1.

EXAMPLE 8

(A-8); Preparation of a copolymer having peroxy bonds therein

A transparent solution consisting of a copolymer having peroxy bonds therein, butyl cellosolve and isopropyl alcohol was prepared, according to the same procedures as in (A-7) of Example 7, except that the charging composition as shown in (A-7) of Table 3 was employed.

Its properties are shown in Table 3

(B-8); Preparation of an aqueous liquid dispersion of polymers

An aqueous liquid dispersion of polymers was prepared, according to the same procedures as in (B-7) of Example 7, except that the copolymerization temperature was 95° C., employing (A-8) product and the charging composition as shown in Table 4.

In neutralization of the carboxylic acid groups of the block copolymer, diethanol amine was employed. The properties of the obtained aqueous liquid dispersion of polymer are shown in Table 4. The application test therefor was carried out like (B-7) of Example 7

EXAMPLE 9

(A-9); A copolymer having peroxy bonds therein (A-7) product was employed.

(B-9); Preparation of an aqueous liquid dispersion of polymers

A milky white aqueous liquid dispersion of polymers whose dispersion solvent consisted of water and ethylcellosolve, was prepared according to the same procedures as in the (B-7) procedure of Example 7, employing (A-7) product and the charging composition as shown in Table 4.

The application test therefor was carried out like the (B-7) procedures.

The properties of the obtained aqueous liquid dispersion of polymers are shown in Table 4.

EXAMPLE 10

(A-10); Preparation of a copolymer having peroxy bonds therein

A transparent solution of a copolymer having peroxy bonds therein and ethylcellosolve was prepared, employing the charging composition as shown in Table 3, according to the same procedures as in the (A-7) procedure of Example 7.

Its properties are shown in Table 3.

(B-10); Preparation of an aqueous liquid dispersion of polymers

A milky white aqueous liquid dispersion of polymers whose dispersion solvent was a mixture of water, ethylcellosolve and isopropyl alcohol, was obtained according to the same procedures as in (B-7) procedure of Example 7 employing (A-10) product and the charging composition as shown in Table 4.

For the neutralization of the carboxylic acid groups in the obtained block copolymer, 25% aqueous solution of ammonia was employed. Its properties are shown in Table 4.

EXAMPLE 11

(A-11); A copolymer having peroxy bonds therein (A-7) product was employed.

(B-11); Preparation of an aqueous liquid dispersion of polymers.

Into the same reaction vessel as used in Example 7, 20 parts of ethylcellosolve were charged and were heated up to 80° C. while introducing nitrogen gas therein.

A mixture of the (A-7) product and vinyl type monomers which are shown in the charging composition of Table 4 was dropped into the reaction vessel for 2 hours. The contents of the reaction vessel were subjected to block copolymerization for 3 hours and were cooled to room temperature, followed by neutralizing with 3.0 parts of triethyl amine, thereby to obtain a mixed solution of a block copolymer and ethylcellosolve.

The said mixed solution was admixed with 500 parts of n-hexane with stirring and was allowed to stand, thereby settling a white precipitate which was filtered off and was dried at reduced pressure at room temperature, whereby a white powder of a block copolymer was obtained.

The said white powder was admixed with 120 parts of water, obtaining a milky white aqueous liquid dispersion of polymers whose dispersion liquid was water alone. Its properties are shown in Table 4.

The application test therefor was carried out like (B-7) of Example 7.

EXAMPLE 12

(A-12); Preparation of a copolymer having peroxy bonds therein

A transparent solution of ethylcellosolve and a copolymer having peroxy bonds therein was prepared employing itaconic acid as the vinyl type unsaturated carboxylic acid monomer and the charging composition as shown in Table 3, according to the same procedures as described in the (A-7) procedure of Example 1.

(B-12); Preparation of an aqueous liquid dispersion of polymers

A milky white aqueous liquid dispersion of polymers was prepared employing the (A-12) product, the same vinyl type monomers as used in (B-10) procedure of Example 10 and the charging composition, according to the same procedure as described in the (B-7) procedure of Example 1. Its properties are shown in Table 4. The application test therefor was carried out like (B-7) of Example 7.

EXAMPLE 13

(A-13); Preparation of a copolymer having peroxy bonds therein

According to the same procedures as in (A-1) procedures of Example 1, a methylcellosive solution of a copolymer having peroxy bonds therein was prepared with the charging composition described in Table 5 consisting of

| | |
|---|---|
| Ethyl cellosolve | 30 |
| Ethyl acrylate | 25 |
| Butyl acrylate | 10 |
| Methyl methacrylate | 25 |
| $\left[\begin{array}{c}\overset{O}{\underset{\|}{C}}(CH_2)_4\overset{O}{\underset{\|}{C}}O(CH_2)_4\overset{O}{\underset{\|}{C}}(CH_2)_4\overset{O}{\underset{\|}{C}}OO\end{array}\right]_n$ | 5 |

$n \approx 5.5$

TABLE 3

| | | | | Example | | | |
|---|---|---|---|---|---|---|---|
| | | | | A-7 | A-8 | A-10 | A-12 |
| Charging Composition | Aqueous organic solvent | | Ethylcellosolve | $20^1 +$ $30^2$ | — | $10^1 +$ $20^2$ | $10^1 +$ $20^2$ |
| | | | Butylcellosolve | — | $30^2$ | — | — |
| | | | Isopropyl alcohol | — | $20^1$ | — | — |
| | Vinyl monomer A | Vinyl type unsaturated carboxylic acid monomer | Acrylic acid | 3.75 | 1.25 | 2.5 | — |
| | | | Itaconic acid | — | — | — | 2.0 |
| | | Vinyl type monomer other than | Styrene | 7.5 | 7 | 5.5 | 6 |
| | | | Butyl acrylate | 8.75 | 8.75 | 8 | 8 |
| | | | 2-Ethylhexyl acrylate | 5 | 5 | 6 | 6 |

TABLE 3-continued

| | | Example | | | |
|---|---|---|---|---|---|
| | | A-7 | A-8 | A-10 | A-12 |
| vinyl type unsaturated carboxylic acid monomer | Hydroxyethyl methacrylate | — | 3 | 3 | 3 |
| Polymeric peroxide | $\left[-C(CH_2)_4CO(CH_2)_4OC(CH_2)_4COO-\right]_{5.5}$ (with O= on each C) | 5 | — | — | 2.5 |
| | $\left[-C(CH_2)_4CO(CH_2)_2O(CH_2)_2O(CH_2)_2OC(CH_2)_4COO-\right]_{5.8}$ | — | — | 2.5 | — |
| | $\left[-C(CH_2)_4COOCCH_2CH_2COO-\right]_{3.5}$ (with CH$_3$ groups) | — | 1 | — | — |
| | Aromatic diester polymeric peroxide structure, subscript 3.6 | — | 3.5 | — | — |
| Properties of the obtained solution of a copolymer having peroxy bonds therein | Content of a copolymer having peroxy bonds therein (%) | 37.6 | 36.9 | 47.3 | 45.1 |
| | Viscosity at 25° C. (poise) | 0.6 | 0.9 | 3.4 | 5.6 |

Note:
[1]Number of parts of solvent which was charged into the reaction vessel at first
[2]Number of parts of solvent which was charged with vinyl monomer A and polymeric peroxides

TABLE 4

| | | | Example | | | | | |
|---|---|---|---|---|---|---|---|---|
| | | | 7 B-7 | 8 B-8 | 9 B-9 | 10 B-10 | 11 B-11 | 12 B-12 |
| Charging composition | Solution of copolymer having peroxy bonds therein | (A-7) product | 60 | — | 60 | — | 60 | — |
| | | (A-8) product | — | 60 | — | — | — | — |
| | | (A-10) product | — | — | — | 60 | — | — |
| | | (A-12) product | — | — | — | — | — | 60 |
| | [1]Aqueous organic solvent D | Ethylcellosolve | 20 | 20 | 20 | 10 | 20 | 20 |
| | | Isopropyl alcohol | — | — | — | 10 | — | — |
| | Vinyl monomer B | Ethyl acrylate | 25 | 25 | 15 | — | 19 | — |
| | | Butyl acrylate | 10 | 10 | 12.5 | 40 | 10 | 40 |
| | | Methyl methacrylate | 25 | 25 | 25 | — | 24.5 | — |
| | | Butyl methacrylate | — | — | — | — | — | — |
| | | Styrene | — | — | — | 45 | — | 45 |
| | Vinyl monomer C | Hydroxyethyl methacrylate | — | — | 7 | 15 | 6 | 15 |
| | | Acrylic acid | — | — | 0.5 | — | 0.5 | — |
| | Neutralization agent | Triethyl amine | 2.8 | — | 3.0 | — | 3.0 | 2.3 |
| | | Diethanol amine | — | 1.3 | — | — | — | — |
| | | 25% Aqueous solution of ammonia | — | — | — | 3.6 | — | — |
| | Water | | 120 | 120 | 120 | 60 | 120 | 60 |
| Properties of an aqueous liquid dispersion of polymers | Content of block copolymer (%) | | 32.5 | 31.7 | 31.9 | 57.3 | 40.5 | 54.7 |
| | Viscosity at 25° C. | | 0.3 | 0.2 | 1.1 | 10.5 | 5.8 | 14.5 |
| | Storage stability[2] at 25° C. (after 6 months) | | good | good | good | good | good | good |
| | Result of application[3] test | | good | good | good | good | good | good |

Note:
[1]Solvent was charged into the reaction vessel at first
[2]Storage stability of the obtained product, wherein no appreciable precipitation of the particles therein, no appreciable separation thereof into two layers and no changes of viscosity thereof were observed, was evaluated as good
[3]In the application test for the obtained product, evaluation of good shows that the coating film thereof was smooth and lustrous and no appreciable foaming nor flagging therein was observed.

Namely, 20 parts of ethylcellosolve were charged into the same reaction vessel as used in Example 1, and were heated up to 75° C., while introducing nitrogen gas therein, wherein the said charging composition was charged for one hour.

The contents of the reaction vessel were subjected to copolymerization.

The resultant product contained 56.5% of a copolymer having peroxy bonds therein and it was a transparent liquid containing ethylcellosolve whose viscosity was 2.5 poise at 25° C.

(B-13); Preparation of an aqueous liquid dispersion of polymers

An aqueous liquid dispersion of polymers whose dispersion solvent was water and ethylcellosolve, was prepared with the charging composition described in Table 6 consisting of

| (A-13) product | 115 |
|---|---|
| Acrylic acid | 2.8 |
| Styrene | 5.6 |
| Butyl acrylate | 6.6 |
| 2-Ethylhexyl acrylate | 3.8 |

Namely, 20 parts of ethylcellosolve were charged into the same reaction vessel as used in Example 1 and were heated at 80° C. while introducing nitrogen gas therein.

The said charging composition was charged into the reaction vessel for 2 hours. The contents of the reaction vessel were subjected to block copolymerization at 80° C. for 3 hours.

The resultant reaction liquid was cooled to room temperature and was neutralized with 2.8 parts of triethylamine, followed by admixing with 120 parts of water, whereby a milky white aqueous liquid dispersion of polymers was obtained.

Its properties are shown in Table 6. The application test therefor was carried out according to the same procedures as in Example 1.

EXAMPLE 14

(A-14); Preparation of a copolymer having peroxy bonds therein

According to the same procedures as described in (A-13) of Example 13, a transparent solution of a copolymer having peroxy bonds therein with butylcellosolve and isopropyl alcohol was prepared, except that the copolymerization temperature was 90° C. and the charging composition which is described in (A-14) of Table 5 was employed. The properties of the obtained product are shown in Table 5.

(B-14); Preparation of an aqueous liquid dispersion of polymers

According to the same procedures as described in (B-13) procedures of Example 13, except that the copolymerization temperature was 95° C. and that the charging composition which is described in (B-14) of Table 6 was employed, a milky white aqueous liquid dispersion of polymers whose dispersion solvent was water and ethylcellosolve, butyl cellosolve and isopropyl alcohol, was prepared.

In the preparation, diethanol amine was employed for the neutralization of the carboxylic acid groups in the obtained product. The properties of the obtained aqueous liquid dispersion of polymers are shown in Table 6. The application test therefor was carried out like the (B-13) procedures of Example 13.

EXAMPLE 15

(A-15); A copolymer having peroxy bonds therein (A-13) product was employed.

(B-15); Preparation of an aqueous liquid dispersion of polymer

According to the same procedures as in the (B-13) procedures of Example 13, except that the charging composition which is described in (B-15) of Table 6, was employed, an aqueous liquid dispersion of polymers was prepared.

Its properties are shown in Table 6. The application test therefor was carried out like (B-13) of Example 13.

EXAMPLE 16

(A-16); Preparation of a copolymer having peroxy bonds therein

According to the same procedures as in (A-13) procedures of Example 13, except that charging composition which is described in Table 5, a mixed transparent solution of a copolymer having peroxy bonds therein and ethylcellosolve was prepared.

Its properties are shown in Table 5.

(B-16); Preparation of an aqueous liquid dispersion of polymers

According to the same procedures as in (B-13) procedures of Example 13, except that the (A-16) product and the charging composition which is described in (B-16) of Table 6, were employed, a milky white aqueous liquid dispersion of polymers whose dispersion solvent was water, ethylcellosolve and isopropyl alcohol was obtained. In the preparation, 25% aqueous solution of ammonia was employed for the neutralization of the carboxylic acid groups of the resultant product.

The properties of the obtained aqueous liquid dispersion of polymers are shown in Table 6.

EXAMPLE 17

(A-17); A copolymer having peroxy bonds therein A solution of (A-13) product was employed.

(B-17); Preparation of an aqueous liquid dispersion of polymers

Into the same reaction vessel as used in the (B-13) procedures of Example 13, there were charged 20 parts of ethylcellosolve and were heated up to 80° C., while introducing nitrogen gas therein, wherein the charging composition which was a mixture of vinyl type monomers and (A-13) product, as described in (B-17) of Table 6, was dropped for 2 hours.

The contents of the reaction vessel were subjected to block copolymerization at 80° C. for 3 hours, and were cooled to room temperature, followed by neutralizing with 3.0 parts of triethyl amine, whereby a mixed solution of a block copolymer and ethylcellosolve was obtained.

The obtained mixed solution was admixed with 500 parts of n-hexane with stirring and was allowed to stand, thereby setting a white precipitate.

The white precipitate was filtered off and was dried at reduced pressure at room temperature, thereby eliminating the ethylcellosolve to obtain a white powder of a block copolymer.

The obtained block copolymer was admixed with 120 parts of water while stirring, whereby a milky white aqueous liquid dispersion of polymers whose dispersion solvent was water alone, was obtained. Its properties are shown in Table 6.

The application test therefor was carried out like the (B-13) procedures of Example 13.

EXAMPLE 18

(A-18); Preparation of a copolymer having peroxy bonds therein

According to the same procedures as in (A-13) procedures of Example 13, there was produced transparent solution of a copolymer having peroxy bonds therein with ethylcellosolve as that described in Example 13, employing that the charging composition as shown in (A-18) of Table 5.

Its properties are shown in Table 5.

(B-18); Preparation of an aqueous liquid dispersion of polymers

According to the same procedures as in the (B-13) procedures of Example 13, a milky white aqueous liquid dispersion of polymers whose dispersion liquid was water and ethylcellosolve, was prepared employing the (A-18) product, itaconic acid as the vinyl type unsaturated carboxylic acid group and the charging composition as described in (B-18) of Table 6. Its properties are shown in Table 6.

TABLE 5

|  |  |  | Example | | | |
|---|---|---|---|---|---|---|
|  |  |  | 13 A-13 | 14 A-14 | 16 A-16 | 18 A-18 |
| Charging Composition | Aqueous organic solvent | Ethylcellosolve | $20^1 + 30^2$ | — | $10^1 + 20^2$ | $10^1 + 20^2$ |
|  |  | Butylcellosolve | — | $30^2$ | — | — |
|  |  | Isopropyl alcohol | — | $20^1$ | — | — |
|  | Vinyl monomer B | Ethyl acrylate | 25 | 25 | — | — |
|  |  | Butyl acrylate | 10 | 10 | 20 | 20 |
|  |  | Methyl methacrylate | 25 | 25 | — | — |
|  |  | Styrene | — | — | 22 | 22 |
|  | Vinyl monomer C | Hydroxyethyl methacrylate | — | — | 8 | 8 |
|  | Polymeric peroxide | $\left[\begin{array}{c} O \quad O \quad O \quad O \\ \parallel \quad \parallel \quad \parallel \quad \parallel \\ -C(CH_2)_4OC(CH_2)_4OC(CH_2)_4COO- \end{array}\right]_n$  $n \approx 5.5$ | 5 | — | — | 2.5 |
|  |  | $\left[\begin{array}{c} O \quad O \quad\quad\quad O \quad O \\ \parallel \quad \parallel \quad\quad\quad \parallel \quad \parallel \\ -C(CH_2)_4CO(CH_2)_2O(CH_2)_2O(CH_2)_2OC(CH_2)_4COO- \end{array}\right]_n$  $n \neq 5.8$ | — | — | 2.5 | — |
|  |  | $\left[\begin{array}{c} O \quad O \quad CH_3 \quad CH_3 \\ \parallel \quad \parallel \quad \mid \quad\quad \mid \\ -C(CH_2)_4COOCCH_2CH_2COO- \\ \quad\quad\quad\quad\quad CH_3 \quad\quad CH_3 \end{array}\right]_n$  $n = 3.5$ | — | 1 | — | — |
|  |  | $\left[\begin{array}{c} O \quad\quad\quad\quad O \quad\quad\quad\quad\quad\quad O \quad O \\ \parallel \quad\quad\quad\quad \parallel \quad\quad\quad\quad\quad\quad \parallel \quad \parallel \\ -C-\text{Ph}-CO-\text{H}-C(CH_2)_2-\text{H}-OC-\text{Ph}-COO- \end{array}\right]_n$  $n \approx 3.6$ | — | 3.5 | — | — |
| Properties of the obtained solution of a copolymer having peroxy bonds therein | | Content of the polymer having peroxy bonds therein (%) | 56.5 | 55.7 | 63.0 | 63.1 |
| | | Viscosity at 25° C. (poise) | 5.2 | 5.0 | 10.5 | 10.5 |

Note:
[1] Number of parts of solvent which was charged into the reaction vessel
[2] Number of parts of solvent which was charged with vinyl type monomers and polymeric peroxides in the reaction vessel

TABLE 6

|  |  |  | Example | | | | | |
|---|---|---|---|---|---|---|---|---|
|  |  |  | 13 B-13 | 14 B-14 | 15 B-15 | 16 B-16 | 17 B-17 | 18 B-18 |
| Charging composition | Solution of copolymer having peroxy bonds therein | (A-13) product | 11.5 | — | 11.5 | — | 11.5 | — |
|  |  | (A-14) product | — | 114.5 | — | — | — | — |
|  |  | (A-16) product | — | — | — | 82.5 | — | — |
|  |  | (A-18) product | — | — | — | — | — | 82.5 |
|  | [1]Aqueous organic solvent | Ethyl cellosolve | 20 | 20 | 20 | 10 | 20 | 20 |
|  |  | Isopropyl alcohol | — | — | — | 10 | — | — |
|  | Vinyl type unsaturated carboxylic acid group | Acrylic acid | 2.8 | 1.25 | 2.8 | 2.5 | 2.8 | — |
|  |  | Itaconic acid | — | — | — | — | — | 2.0 |
|  | Vinyl type monomers other than vinyl carboxylic acid group | Styrene | 5.6 | 7 | 1.0 | 5.5 | — | 6 |
|  |  | Butyl acrylate | 6.6 | 8.75 | — | 8 | 16 | 8 |
|  |  | 2-Ethylhexyl acrylate | 3.8 | 5 | 3 | 6 | — | 6 |
|  |  | Hydroxyethyl methacrylate | — | 3 | 3 | 3 | — | 3 |
|  | Neutralization agent | Triethyl amine | 2.8 | — | 2.8 | — | 2.8 | 2.3 |
|  |  | Diethanol amine | — | 1.3 | — | — | — | — |
|  |  | 25% aqueous solution of ammonia | — | — | — | 3.6 | — | — |
|  | Water | | 120 | 120 | 120 | 60 | 120 | 60 |
| Properties of an | | Content of block | 30.8 | 32.0 | 31.1 | 41.9 | 30.9 | 41.7 |

TABLE 6-continued

| | | Example | | | | | |
|---|---|---|---|---|---|---|---|
| | | 13 B-13 | 14 B-14 | 15 B-15 | 16 B-16 | 17 B-17 | 18 B-18 |
| aqueous liquid dispersion of polymers | copolymer (%) Viscosity at 25° C. | 0.3 | 0.4 | 1.2 | 6.2 | 0.2 | 5.7 |
| | Storage stability[2] (25° C. after 6 months | good | good | good | good | good | good |
| | Result of application test[3] | good | good | good | good | good | good |

Note:
[1]Solvent was charged into the reaction vessel at first
[2]Storage stability of the obtained product, wherein no appreciable separation thereof into two layers and no change of viscosity thereof were observed, was evaluated as good
[3]In the application test for the obtained product, evaluation of good shows that the coating film was smooth and lustrous and no appreciable foaming nor flagging therein was observed.

The embodiments of the invention in which an exclusive property or privilege is claimed are defined as follows:

1. A method for preparing an aqueous liquid dispersion, in which the dispersion medium is water or a mixture of water and an organic solvent which is soluble in water, which comprises the steps of:

in a first copolymerization step, copolymerizing one or more polymeric peroxides selected from the group consisting of compounds having the formulas (I) and (II),

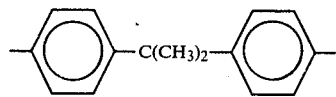

wherein $R_1$ is alkylene having 1 to 18 carbon atoms or phenylene, $R_2$ is (1) alkylene having 2 to 10 carbon atoms,

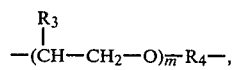

wherein $R_3$ is hydrogen or methyl, $R_4$ is alkylene having 2 to 10 carbon atoms, m is an integer of 1 to 13,

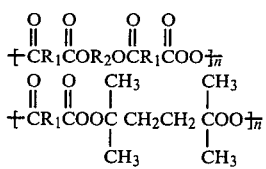

and n is from 2 to 20, with a first vinyl monomer component A which is copolymerizable with said polymeric peroxides and consists essentially of from 5 to 40 percent by weight of one or more vinyl carboxylic acid monomers and the balance is one or more, first, vinyl monomers free of carboxyl groups, thereby obtaining copolymers having carboxyl groups and peroxy bonds therein;

then neutralizing more than 50 mole percent of the carboxyl groups of said copolymers with an organic amine or an inorganic alkali;

then, in a second, block copolymerization step, subjecting said copolymers having peroxy bonds therein to block copolymerization, in the presence of said dispersion medium, with a second monomer component selected from the group consisting of (1) vinyl monomer component B which is copolymerizable with said copolymers having peroxy bonds therein and consists essentially of one or more, second, vinyl monomers, said second vinyl monomer being free of carboxyl groups and polymers of said second vinyl monomers being insoluble in said dispersion medium, and (2) vinyl monomer component C which is copolymerizable with said copolymers having peroxy bonds therein and consists essentially of a mixture of vinyl monomer component B and one or more, third, vinyl monomers, said third vinyl monomers being different from said vinyl monomer component B and polymers of said third vinyl monomers being soluble in said dispersion medium, and wherein the polymers of said vinyl monomer component C are insoluble in said dispersion medium, and thereby obtaining block copolymers dispersed in said dispersion medium.

2. A method for preparing an aqueous liquid dispersion, in which the dispersion medium is water or a mixture of water with organic solvent which is soluble in water, which comprises the steps of:

in a first copolymerization step, copolymerizing one or more polymeric peroxides selected from the group consisting of compounds having the formulas (I) and (II),

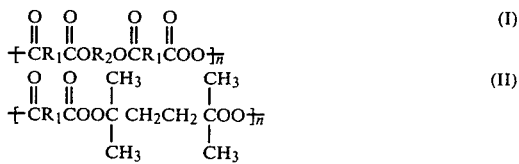

wherein $R_1$ is alkylene having 1 to 18 carbon atoms or phenylene, $R_2$ is (1) alkylene having 2 to 10 carbon atoms,

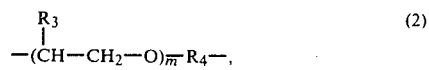

wherein $R_3$ is hydrogen or methyl, $R_4$ is alkylene having 2 to 10 carbon atoms, m is an integer of 1 to 13,

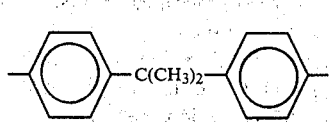
or
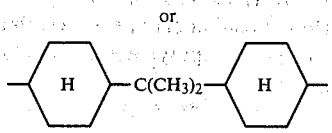

and n is from 2 to 20,
with a first vinyl monomer component A which is copolymerizable with said polymeric peroxides and consists essentially of from 5 to 40 percent by weight of one or more vinyl carboxylic acid monomers and the balance is one or more, first, vinyl monomers free of carboxyl groups, thereby obtaining copolymers having carboxyl groups and peroxy bonds therein;

then, in a second, block polymerization step, subjecting said copolymers having carboxyl groups and peroxy bonds therein to block copolymerization, in the presence of said organic solvent, with a second monomer component selected from the group consisting of (1) vinyl monomer component B which is block copolymerizable with said copolymers having carboxyl groups and peroxy bonds therein and consists essentially of one or more, second, vinyl monomers, said second vinyl monomer being free of carboxyl groups and polymers of said second vinyl monomers being insoluble in said dispersion medium, and (2) vinyl monomer component C which is copolymerizable with said copolymers having carboxyl groups and peroxy bonds therein and consists essentially of a mixture of vinyl monomer component B and one or more, third, vinyl monomers, said third vinyl monomers being different from said vinyl monomer component B and polymers of said third vinyl monomers being soluble in said dispersion medium, and wherein the polymers of said vinyl monomer component C are insoluble in said dispersion medium, thereby obtaining block copolymers having peroxy bonds therein;

then neutralizing more than 50 mole percent of the carboxyl groups of said block copolymers with an organic amine or an inorganic alkali and then mixing said block copolymers with said dispersion medium to obtain said aqueous liquid dispersion.

3. A method for preparing an aqueous liquid dispersion, in which the dispersion medium is water or a mixture of water with organic solvent which is soluble in water, which comprises the steps of:

in a first copolymerization step, copolymerizing one or more polymeric peroxides selected from the group consisting of compounds having the formulas (I) and (II),

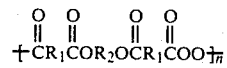 (I)

-continued

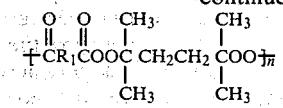 (II)

wherein $R_1$ is alkylene having 1 to 18 carbon atoms or phenylene, $R_2$ is (1) alkylene having 2 to 10 carbon atoms,

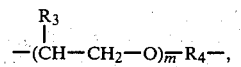 (2)

wherein $R_3$ is hydrogen or methyl, $R_4$ is alkylene having 2 to 10 carbon atoms, m is an integer of 1 to 13,

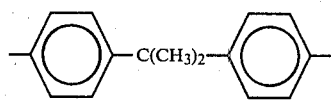 (3)
or
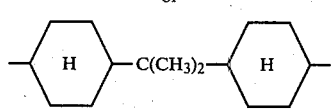 (4)

and n is from 2 to 20,
with a first vinyl monomer component selected from the group consisting of (1) vinyl monomer component B which is copolymerizable with said polymeric peroxides and consists essentially of one or more, second, vinyl monomers, said second vinyl monomer being free of carboxyl groups and polymers of said second vinyl monomers being insoluble in said dispersion medium, and (2) vinyl monomer component C which is copolymerizable with said polymeric peroxides and consists essentially of a mixture of vinyl monomer component B and one or more, third, vinyl monomers, said third vinyl monomers being different from said vinyl monomer component B and polymers of said third vinyl monomers being soluble in said dispersion medium, and wherein the polymers of said vinyl monomer component C are insoluble in said dispersion medium, thereby obtaining copolymers having peroxy bonds therein;

then, in a second, block copolymerization step, subjecting said copolymers having peroxy bonds therein to block copolymerization, in the presence of said organic solvent, with a second monomer component which is copolymerizable with said copolymers having peroxy bonds therein and consists essentially of from 5 to 40 percent by weight of one or more vinyl carboxylic acid monomers and the balance is one or more vinyl monomers being free of carboxyl groups, thereby obtaining block copolymers having carboxyl groups therein;

then neutralizing more than 50 mole percent of the carboxyl groups of said block copolymers with an organic amine or an inorganic alkali and then mixing said block copolymers with said dispersion medium to obtain said liquid dispersion.

4. A method as claimed in claim 1, claim 2 or claim 3, wherein in the first copolymerization step, the amount of said polymeric peroxide is from 0.5 to 20 parts by weight, per 100 parts by weight of said first vinyl monomer component, the copolymerization temperature is from 60° to 130° C. and the copolymerization time is from 2 to 5 hours and, in the second block polymerization step, the block polymerization temperature is from 60° to 140° C.

5. A method as claimed in claim 1, claim 2 or claim 3, wherein the first copolymerization step is carried out in the presence of said organic solvent which is soluble in water so that said copolymer is obtained in the form of a solution in said organic solvent.

6. A method as claimed in claim 5 in which after said first copolymerization step and prior to said second block copolymerization step, said organic solvent is removed from said copolymer.

7. A method as claimed in claim 1, claim 2 or claim 3 in which said dispersion medium contains less than 80 wt. % of said organic solvent.

8. A method as claimed in claim 1, claim 2 or claim 3 in which said aqueous liquid dispersion contains from 30 to 70 wt. % of said dispersion medium.

9. A method as claimed in claim 8, in which from 5 to 70 wt. % of said block copolymers are soluble in said dispersion medium.

* * * * *